US006643464B1

(12) United States Patent
Roorda et al.

(10) Patent No.: US 6,643,464 B1
(45) Date of Patent: Nov. 4, 2003

(54) CONSTRAINED OPTICAL MESH PROTECTION FOR TRANSMISSION SYSTEMS

(75) Inventors: Peter Roorda, Hertford (GB); Nigel Baker, Harlow (GB); Adrian P Sparks, Ongar (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/349,349

(22) Filed: Jul. 7, 1999

(51) Int. Cl.$^7$ ............................................... H04B 10/20
(52) U.S. Cl. ........................................... 398/59; 398/50
(58) Field of Search ................................ 359/119, 110, 359/124, 127, 128, 166; 340/2.7; 714/4; 370/224; 385/24; 398/50, 59, 58, 45

(56) References Cited

U.S. PATENT DOCUMENTS

| 5,159,595 | A | | 10/1992 | Flanagan ................... 370/224 |
| 6,038,044 | A | * | 3/2000 | Fee et al. ................... 359/119 |
| 6,278,689 | B1 | * | 8/2001 | Afferton et al. ............ 359/119 |
| 6,295,146 | B1 | * | 9/2001 | Nathan et al. .............. 359/119 |
| 6,404,734 | B1 | * | 6/2002 | Stamatelakis et al. ...... 370/227 |

FOREIGN PATENT DOCUMENTS

| WO | WO97/09803 | 3/1997 |
| WO | WO99/23773 | 5/1999 |

OTHER PUBLICATIONS

U.S. patent application Ser. No. 09/219,006, Baker, filed Dec. 23, 1998.
OFC/100C '99 San Diego, California "Availability analysis of optical shared protection rings for long haul networks" by Neusy and Habel.

* cited by examiner

Primary Examiner—Brent A. Swarthout
(74) Attorney, Agent, or Firm—Barnes & Thornburg

(57) ABSTRACT

To provide improved protection bandwidth efficiency for a fast recovery from a fault in an optical network, a protection ring for sharing between some of the protection paths has a pre-configured route so as to overlap on a given one of the links, with other protection paths or other rings. A selector for the given link selects which of the overlapping secondary paths is allocated to the given link at any time. Thus, two types of sharing of protection paths are combined to achieve more efficient use of protection bandwidth. The link selector can be controlled locally and so can operate more rapidly. The local control, essentially independent of the switches used to set up the secondary path through the network, makes the combination easier to scale to larger, more complex networks than shared rings alone.

18 Claims, 8 Drawing Sheets

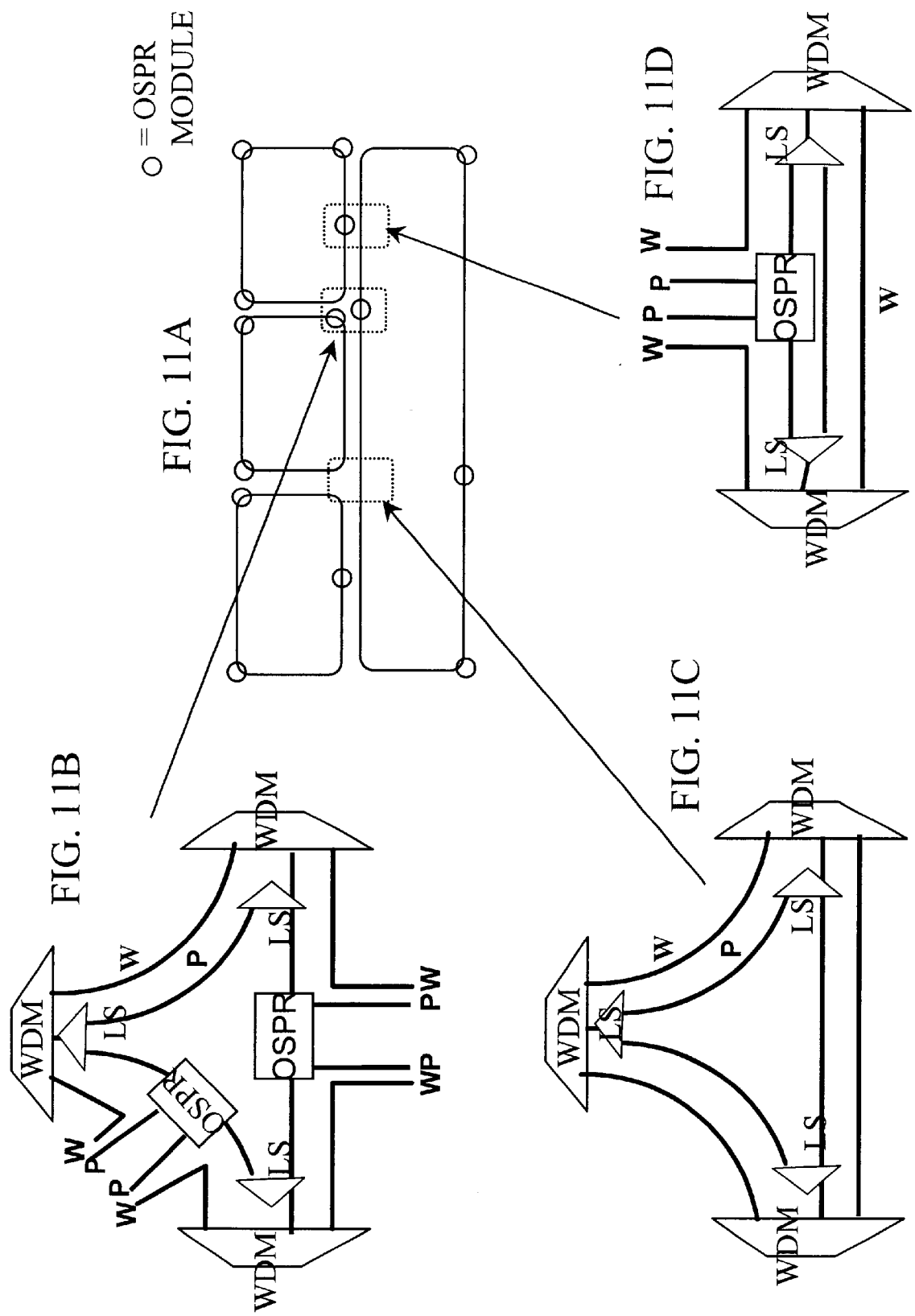

CONSTRAINED OPTICAL MESH PROTECTION FOR TRANSMISSION SYSTEMS

RELATED APPLICATIONS

This application relates to U.S. application Ser. No. 09/219,006, entitled Shared Optical Protection in an Optical Communications network, filed Dec. 23, 1998, now abandoned Nortel Networks reference ID1073, which is hereby incorporated in its entirety.

FIELD OF THE INVENTION

This invention relates to optical transmission networks, to nodes for use in such networks, to link selectors for use in such nodes, to controllers for link selectors, to protection path sharing arrangements for optical transmission links, to methods of transmitting data over such networks, to software for managing such networks, and to software for determining configuration of secondary paths in such networks.

BACKGROUND TO THE INVENTION

Optical transmission systems are often constructed with a fault recovery mechanism so that if there is a complete loss of transmission capability, e.g. from a cut in the fibre, or a failure in the transmission path for any other reason, the traffic can be reallocated to other physically diverse routes. Known fault recovery mechanisms can be classed in two categories, firstly mesh restoration schemes, and secondly linear or ring protection methods. The term "protection" implies a very fast recovery. The term "restoration" implies a slower recovery with correspondingly more disruption to traffic.

Mesh restoration method speeds may be in the order of one to fifteen minutes, but are relatively efficient in terms of the amount of bandwidth set aside for recovery. Linear or ring protection methods may complete their operation in the order of ten to sixty milliseconds, but are less bandwidth efficient, typically requiring fifty to seventy percent of network capacity to be set aside for protection.

Restoration may take place at various layers of the well-known OSI model. There are advantages to conducting the restoration at the lowest feasible level, to minimise congestion that can be caused by delays and retransmissions of traffic. Restoration at the optical level, by switching a signal to another optical path, can be done either by optical switching, or by converting into the electrical domain, and switching in the electrical domain, if necessary, using demultiplexing if the bitrate of the optical signal is too high for electrical switching.

Mesh restoration operates by identifying several different alternative paths through the mesh to the destination node according to availability of bandwidth on these paths. The traffic is divided between these alternative paths, and recombined at the destination node, at the far side of the fault. It is bandwidth efficient because the amount of bandwidth on each link set aside for protection purposes need only be a fraction of the bandwidth of each working transmission path. However, it is usually slow to operate because for a given fault in the mesh, the alternative routes need to be determined, often by a central controller, and it may take time for the numerous nodes in the different paths to be configured. Then the traffic can be divided appropriately between the various protection paths to the destination node.

The software for controlling such restoration may be complex, and may require manual intervention, for a large mesh network.

Linear or ring protection methods involve providing a preconfigured (and often dedicated, though it can be shared) protection path for each link. Since the working path will normally take the shortest route between nodes, the protection path will normally involve more links than the working path. Accordingly, over the entire network, more protection path bandwidth needs to be provided than working bandwidth, and so working bandwidth may be as low as twenty to fifty percent of total bandwidth. This is expensive but it enables the protection path to be switched with a minimum of processing. Ideally, as soon as the fault is detected, a signal is sent to a switch at each end of the protection path to bring the protection path into operation. In this case there are only two switches to operate, there is no path determination, or splitting up and recombination of the signal. The process needs no central control, and can therefore happen very quickly, in the order of ten to sixty milliseconds.

Many variations have been proposed, within each of these two categories, attempting to achieve a physical layer fault recovery scheme that is both fast, and offers efficient use of bandwidth. In the category of protection schemes, one known option is to provide a pre-configured, dedicated protection path for each working path. A simple example is shown in FIG. 1.

Another example is known from U.S. Pat. No. 5,159,595, (Nortel Networks reference RR1110) showing a bidirectional ring, and a capability at nodes next to a fault, to couple a working path onto the path going in the other direction around the ring, to create a folded loop. Another example making use of an optical switch to enable a protection ring to bypass a node is shown in WO97/09803 (Nortel Networks reference RR2473).

Another proposal for a protection scheme is shown in patent publication WO9923773 (Nortel Networks reference RR2258) involving an optical network made up of working paths in the form of SONET rings. On a link where protection paths for these SONET rings overlap, instead of providing two fibers for the two protection paths, a single fiber is shared by the two protection paths. An optical selector needs to be provided at the nodes at each end of the link. At these nodes, the protection paths pass through ADMs (Add Drop Multiplexers), where the protection path would be converted to the electrical domain to enable the working path to be switched onto the protection path. Although offering a bandwidth saving, the disadvantage of the optical degradation introduced by the optical selector, or the cost of additional equipment to overcome this, have tended to outweigh the benefit. Accordingly, this proposal has not been adopted on a commercial scale. More recently, sharing of protection bandwidth has been achieved in a different way, by optical shared protection rings (OSPR). This technique has been adopted for commercial use.

FIG. 2 shows an OSPR. The protection ring extends over several links in the network. On each link, the single ring can effectively replace several dedicated protection paths. Each of the protection paths still follows a preconfigured route around part of the ring. Accordingly, there is no need to determine a route and divide up the traffic, and so the speed of recovery is relatively good. As this protection ring can be shared between multiple protection paths, there is an improvement in bandwidth efficiency over using dedicated paths, to a ratio in the illustrated example of 1 protection path to 1 working path, i.e. 50% bandwidth efficient.

An OSPR scheme has been published in "Technical Digest of the Optical Fiber Communication Conference and the International Conference on Integrated Optics and Optical Fiber Communication, San Diego, Calif., Feb. 21–26, 1999, paper entitled Availability analysis of optical shared protection rings for long haul networks, by Philippe Neusy and Richard Habel, pages 176/TuL5-1 to 179/Tul5-4".

OSPR has been regarded as an optimum solution that can be tailored to suit the networks of working paths arranged in either rings or meshes. Efforts to achieve further bandwidth efficiency improvements have therefore focussed on how to arrange the protection rings to be shared between more protection paths on the rings.

References to optical networks in this document are not intended to be limited to all-optical, but are intended to include for example networks making use of optical transmission and electrical domain switching.

References to nodes in the network can encompass add/drop points where traffic is added or dropped from the network. They can also encompass re-routing junctions where no traffic is added or dropped from the network. References to links between nodes are intended to encompass lines between add/drop points, or re-routing junctions, which may include a proportion of a span, or one or more spans. Spans are optical paths between electrical regeneration or optical amplification points.

References to working paths are intended to encompass end to end paths set up over multiple networks, or over multiple links in a network, or over parts of rings in a network. References to a mesh of working paths are intended to encompass any arrangement of paths beyond a single path, including combinations of rings.

References to secondary paths are intended to encompass protection paths and any path provided as an alternative or back up, in case of failure of a working path. The term "transponders" is used throughout and is intended to encompass transceivers, remodulators, regenerators and any device for receiving an optical signal and transmitting the signal onwards at the same or a different wavelength. They may be used for signal regeneration, for enhancing reach, or for wavelength conversion. They may also be used to carry out performance monitoring, and couple network signalling to the optical signal.

SUMMARY OF THE INVENTION

According to a first aspect of the invention, there is provided an optical network comprising a number of nodes and links between the nodes, a mesh of working paths provided over the links and nodes, a number of secondary paths provided over the links and nodes, each for use in case of a failure in a different part of one of the working paths, a first shared protection ring being provided for shared use by the secondary paths, and being arranged to overlap on a given one of the links with one or more of the secondary paths that do not share that first shared protection ring; and a link selector to select which of the first shared protection ring or the one or more secondary paths routed to overlap on the given link, is allocated to the given link at any time.

An advantage of further bandwidth efficiencies can arise from the recognition that two forms of overlap of protection paths, by link selector and by shared ring, previously seen as alternatives, can in fact be combined.

Since the link selectors can be controlled locally, and essentially independently of the shared ring, the greater bandwidth efficiency can be achieved in a way that is more scalable to more complex networks, than is the known optical shared ring alone. Also, some of the apparent disadvantages of the link selector, such as the above mentioned degradation of the optical path of the shared link, can be reduced when the link selector is used in combination with a shared ring.

Furthermore, link selectors can be added to existing optical shared rings without needing major reconfiguration of the rings, since the link selectors can be controlled locally, and essentially independently of the shared rings.

By using a link selector for a pre-determined route, rather than dynamic routing of secondary paths, a number of advantages are obtained. The speed penalty of dynamic routing and the complex centralised control of bandwidth allocation can be avoided. Instead, the selector can be controlled locally and so can operate rapidly. The local control, which can be essentially independent of the switches used to set up the secondary path through the network, also makes the technique scalable to larger, more complex networks without an increase in complexity of control.

Additional Preferred Features, and Their Advantages

Preferably, any overlapping secondary paths and any overlapping shared rings being arranged such that any two of them do not overlap more than once with each other.

This condition ensures that a secondary path still exists for every working path in the event of any single fault. This condition can be maintained either for all secondary paths, or just a subset, e.g. those related to higher priority working paths.

Preferably the first shared protection ring comprises a first optical switch for coupling one or more of the secondary paths to the first shared protection ring, the optical switch being located adjacent to the link selector, on the first shared protection ring.

An advantage arises from having an optical switch on the ring next to the link selector rather than an electrical switch. The electrical switch needs an integral optical transmitter, (integral because separation of the optical transmitter would involve taking high speed electrical signals out of an integrated package, which is costly or technically impractical) and the link selector cannot easily be integrated before the transmitter. Accordingly, the link selector will be in the optical path and will degrade the optical path or will need a separate amplifier, transponder or transmitter, which can be so expensive as to outweigh other advantages. These difficulties can be reduced by providing an optical switch, since such a switch needs no integrated transmitter. Instead, having the optical switch and the link selector adjacent offers opportunities for sharing components such as transponders, to improve the trade off between cost, and optical performance. This advantage can apply whether the link selector is formed by an electrical or an optical switch.

Preferably one of the nodes of the network comprises a transponder, at least part of the transponder being located on a link side of the link selector. This enables fewer transponders to be used, and means that optical degradations introduced by the link selector may not reach the link. Thus cheaper components can be used in the link selector. This is particularly significant at higher speeds or for longer reach systems, where the cost of a transponder can be the dominant cost of a node or even of the whole network.

Preferably the network comprises a first optical switch for coupling one or more of the secondary paths to the first shared protection ring, the optical switch being located adjacent to the link selector, on the first shared protection ring, and a transponder for converting optical wavelength, to launch an optical signal onto the first shared protection ring, the transponder being located on the coupled secondary path before this path enters the first shared protection ring.

If the transponder is instead located off the shared protection ring, optical degradation around the ring may be worse, but it is possible to arrange for through traffic on the shared protection ring to bypass the transponders completely. This can make the shared ring cheaper, and more easily adaptable to different protocols, and thus easier to upgrade in the future.

Preferably the one or more secondary paths routed to overlap on the given link use a second shared protection ring which overlaps on the given link with the first shared protection ring. This more specific case of selecting between overlapping shared protection rings may yield most bandwidth efficiency improvements. It involves an overlap of two or more shared resources, and so can maximise the overall amount of sharing of the given link. Shared rings are expected to become more widely used in optical networks than other mechanisms.

Preferably the link selector comprises a second optical switch. This may be simpler, cheaper or faster than an electrical switch.

Preferably the link selector is-controllable on the basis of levels of priority of different secondary paths. This may enable different levels of protection or survivability for different working paths to be offered.

Preferably a signalling arrangement is provided between the link selector and a node at the far end of the given link so that the same one of the overlapping secondary paths is selected at both ends of the given link.

This is better than the alternative of having the secondary path inform the link selector at each end of the given link, without any signalling between the respective link selectors. In such a case it would be impossible to resolve conflicting secondary path requests at opposite ends of the given link, and thus misconnections could result. A signalling arrangement can resolve or avoid such conflicts.

Other Aspects of the Invention

Another aspect of the invention provides a node for use in the above network, at a near end of the given link, as claimed.

Another aspect of the invention provides a node for use in the above network, at a far end of the given link, as claimed.

Another aspect provides a link selector as claimed.

Another aspect provides a controller for controlling the link selector, as claimed.

Another aspect provides a method of transmitting traffic using the above network.

Another aspect provides a node for use in an optical network, the network comprising a number of other nodes and links between the nodes, a mesh of working paths provided over the links and nodes, a number of secondary paths provided over the links and nodes, each for use in case of a failure in a different part of one of the working paths, some of the secondary paths having pre-determined routing so as to overlap on a given one of the links, the node being for use at one end of the given link, and comprising: a selector for the given link to select which of the secondary paths routed to overlap on the given link, is allocated to the given link at any time, and, a transponder, the transponder being located on the link side of the link selector.

Another aspect provides a protection path sharing arrangement as claimed.

Another aspect provides software for determining a configuration of secondary paths in the above network, as claimed.

Any of the preferred features may be combined with any of the aspects set out above as would be apparent to a skilled person.

Other advantages will be apparent to a skilled person, particularly in relation to any further prior art other than that discussed above.

BRIEF DESCRIPTION OF THE DRAWINGS

Embodiments of the invention will now be described in more detail by way of example, with reference to the accompanying drawings, in which:

FIG. 11A shows a network made up of overlapping rings, with junctions and Add Drop Multiplexers (ADM), to which the invention may be applied; and FIGS. 11B to 11D illustrate schematically embodiments of the invention at various types of nodes in the network of FIG. 11A.

DETAILED DESCRIPTION

Figure 2:
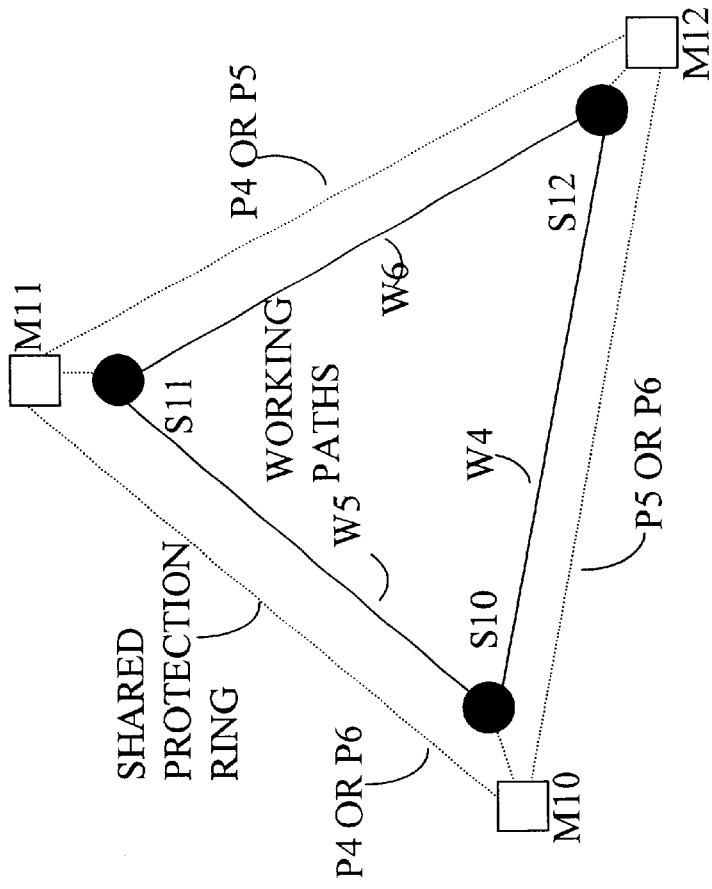
FIG. 2 shows in schematic form a prior art network with a shared protection ring.
Figure 1:
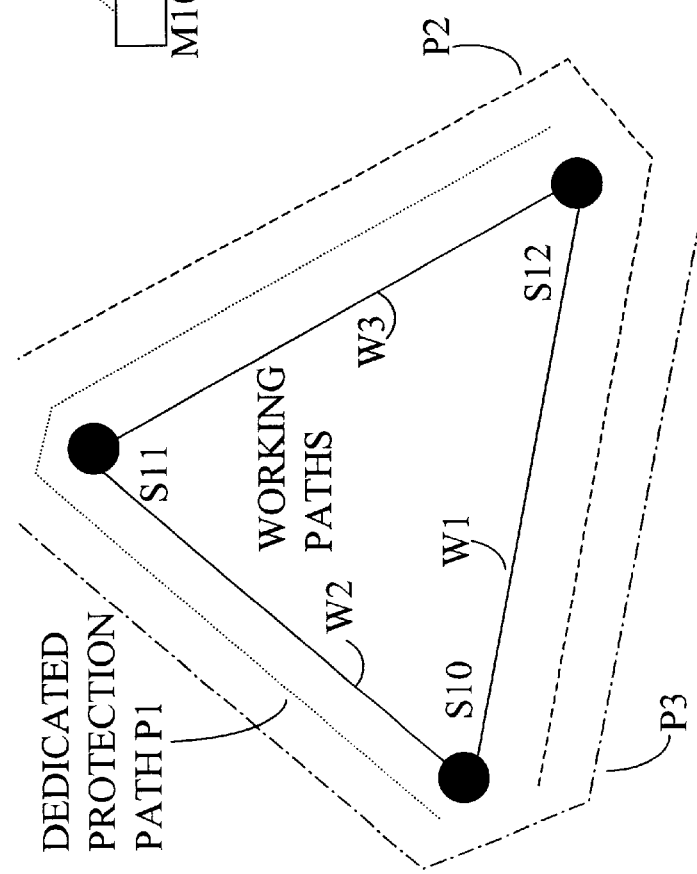
FIG. 1 shows in schematic form a prior art network with dedicated protection paths.

FIGS. 1,2 Prior Art

FIG. 1 shows a simple network, or portion of a network having three working paths, W1, W2 and W3, extending between three nodes incorporating traffic sources S10, S11 and S12 where traffic is coupled onto a working path e.g. by a switch. Working path W1 has a protection path P1 which extends from S10 to S12 via S11. Working path W2 has a protection path P2 which extends from S10 to S11 via S12. Working path W3 has a protection path P3 which extends from S11 to S12 via S10.

In this way each of the working paths has a dedicated protection path. However, each link between the nodes must carry one working path and two protection paths. Accordingly, at least where each working path and protection path has the same bandwidth, the efficiency in bandwidth terms of each link is only 33 percent. As is clear from the illustration, there are two protection paths and one working path on each of the links. Each of the protection paths is pre-configured, so it can be switched quickly.

FIG. 2 shows a known method for increasing the bandwidth efficiency on each of the links. A shared protection ring extends between each of the three nodes. At each node, a shared protection ring module, M10, M11 and M12 is provided to selectively switch one of the working paths onto the protection ring in either direction, or to cause the protection ring to bypass the switch at the node. Protection paths P4, P5, and P6 share the ring. These protection paths are for protecting working paths W4, W5, and W6 respectively, using routes which correspond to protection paths P1, P2 and P3 of FIG. 1.

In this case, as illustrated, the protection ring where it extends between S10 and S11 may carry protection path P4 or P6. Where the ring extends between S11 and S12, it may carry protection path P4 or P5. Where the ring extends between S10 and S12, it may carry protection path P5 or P6.

Figure 3:
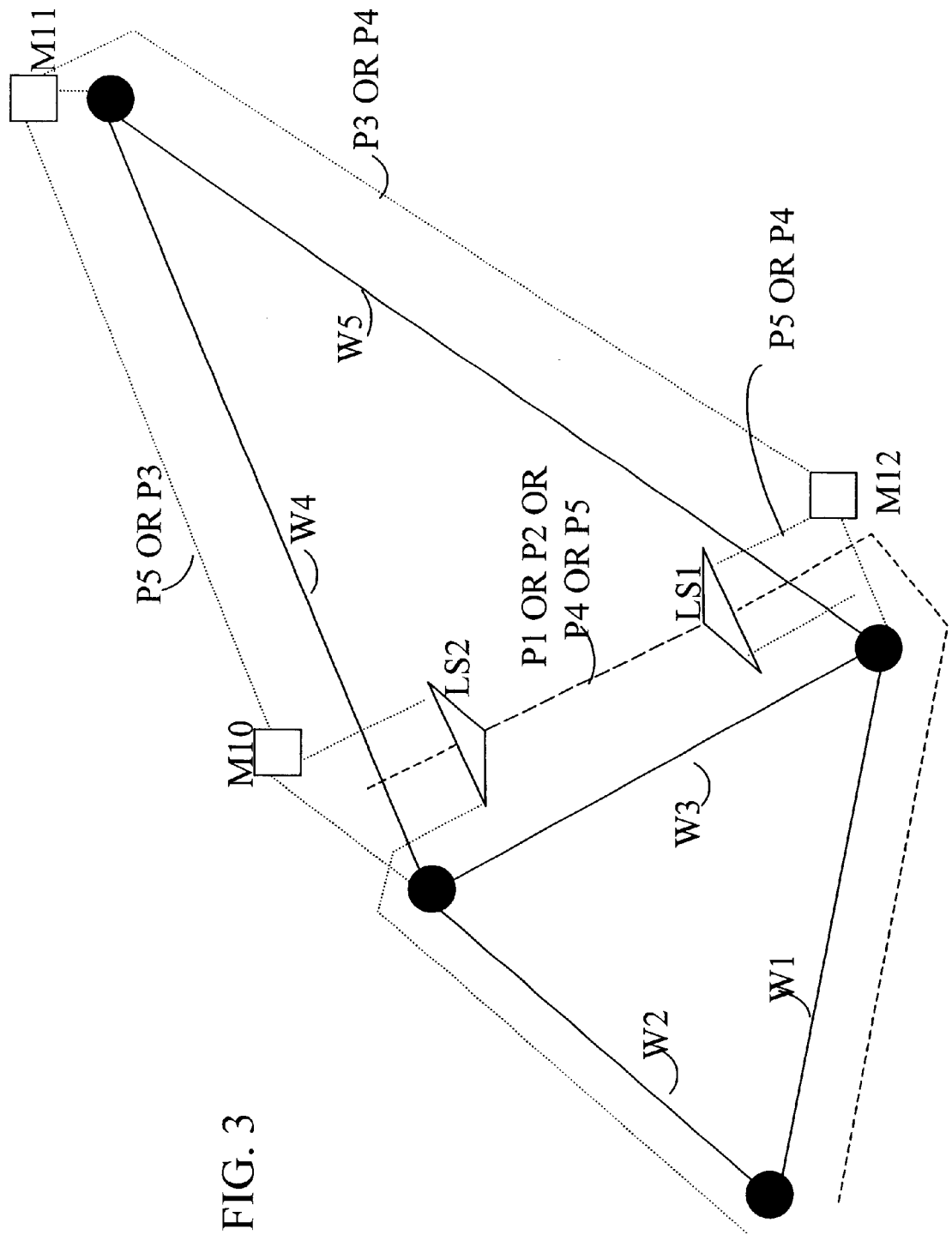
FIG. 3 shows in schematic form a network according to an embodiment of the invention.

FIG. 3, An Embodiment of the Invention

FIG. 3 shows a network formed by joining together the networks shown in FIGS. 1 and 2. In the resulting network, there is one link where the two networks overlap. This is shown as W3 in FIG. 3. The protection path for this shared link is P3, which uses the shared protection ring.

The protection bandwidth over this shared link would normally need to have bandwidth for three protection paths, P1, P2 and the shared protection ring, carrying P4 or P5. As illustrated, selectors LS1 and LS2 are provided at each end of this shared link, to enable the bandwidth for a single protection path, to be shared between the shared protection ring, and dedicated protection paths P1 and P2. In this way, the bandwidth efficiency of this shared link, can be improved from 25 percent to 50 percent, at least for the example of equal bandwidths for all the working paths shown. The link selectors may be optical switches.

If the link selectors LS1 and LS2 are provided so as to be independently controlled from the ring modules M10 and M12, there is an advantage of simpler control, which can enable fast switching of traffic from working path to protection path. In particular, the link selector at a transmitting end of the given link has no routing decision to make, it merely needs to select one of its several inputs. This could be based on a first come first served principle, using a detector to detect traffic on any of the inputs, and select the input on which traffic first appears, and maintain that input until the traffic disappears.

Alternatively, some kind of priority scheme could be implemented, to ensure that if traffic is detected on a high priority input, it takes over the link, even if the link had previously been selected for use by traffic existing on a lower priority input. High priority point to point paths could share protection bandwidth (and thus avoid the cost of dedicated protection paths) with lower priority protection ring schemes, without compromising service quality. Network operators can thus offer differentiated levels of service survivability, and charge different amounts to suit customer requirements. There is an advantage in providing this at the optical layer rather than at packet or cell layers, because it can be faster, and potentially cheaper because it is simpler to reconfigure optical paths or circuits rather than routing packets individually.

At the receiving end, the other link selector need only ensure that traffic on the given link is passed through to the same protection path as has been selected by the transmitting side link selector. Conceivably, this could be achieved by a Y junction broadcasting the traffic to all outputs continuously. From a system point of view, it is preferable if the traffic is routed only to the correct protection path. This may be achieved by providing an optical switch controlled on the basis of information signalled from the transmitting end link selector.

Figure 4:
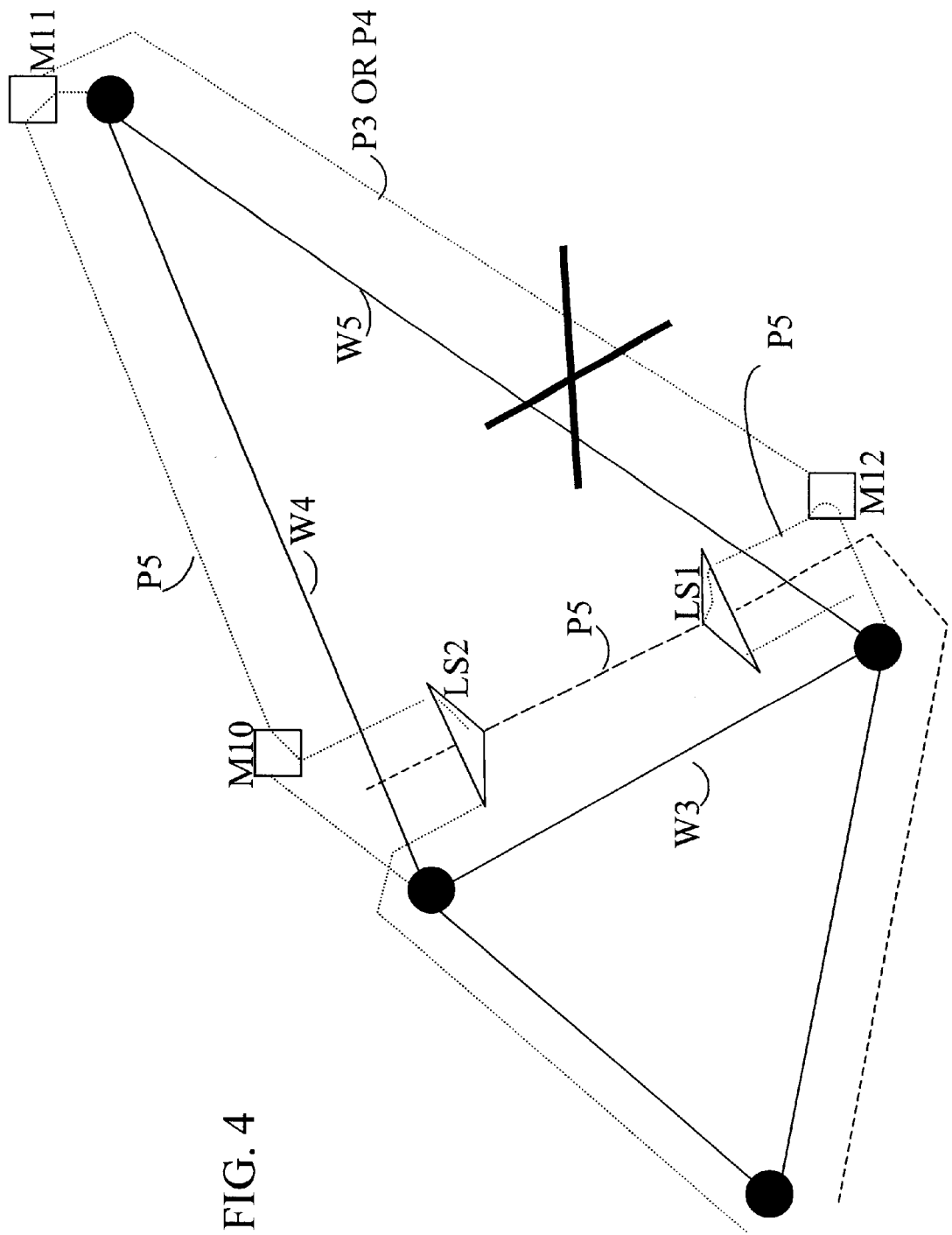
FIG. 4 illustrates in schematic form the network of FIG. 3 in operation.

FIG. 4, Operation of the Embodiment of FIG. 3

FIG. 4 shows what happens if the link which carries working path W5, and the part of the shared protection ring which uses the same link. The switches at either end of the broken link will operate to re-route traffic on working path W5 onto the shared protection ring. Shared protection ring modules M11 and M12 will operate to set up protection path P5 along its pre-determined route along the shared protection ring, to avoid the broken link. Shared protection ring module M10 will also take part in this process, to set up P5.

The link selectors LS1 and LS2 will operate independently to detect traffic on P5 and to ensure that P5 has priority over the other inputs to the links selectors. Since protection path P5 will be bi-directional, each link selector is likely to include a receiver and a transmitter, and therefore whichever end is alerted first to the protection path being set up, would signal to the other link selector, to ensure both ends select the same path.

Overall, the operation of switching to the protection path can be seen in three phases:
a) receiving a trigger indicating a failure has been detected,
b) switching the protection path at each node, involving switching the path at nodes on each side of the failure, and switching at the shared protection ring modules, and
c) the local selection at the link level, by link selectors.

In principle, detecting a failure to trigger protection switching, can be carried out by in various known ways such as detecting loss of light, or detecting bit errors. Light power level detectors are typically provided at optical amplifier inputs, for use in optical amplifier power control. These can be adapted for detecting faults. It may be preferable to use bit error rates (BER), since there may be occasions where there is light being transmitted, but no information, for example where an optical amplifier downstream of a fibre cut. In this case, the optical amplifier may be generating light, and therefore downstream of the optical amplifier, light detectors would not detect a fault, whereas bit error rate detectors would still detect a fault. BER detectors can be incorporated in transponders, which are discussed below.

Having detected a fault, the fault indication needs to be passed to the start and finish of the appropriate protection path, to enable the traffic to be switched to the protection path for as long as the fault exists. This could be achieved using conventional signalling techniques either on a separate wavelength, or using part of the overhead of the wavelength carrying traffic.

With reference to FIG. 4, the node at the receiving end of the broken link would detect the fault, or would receive a fault indication from a regeneration point along the link. Where the link is bi-directional, both ends of the broken link would be alerted to the fault. In each node, there would be a switch for re-routing traffic destined for working path W5, onto its corresponding protection path P5. At the intervening node along the protection path P5, shared protection ring module M10 needs to be alerted to ensure the shared protection ring is allocated to path P5 as illustrated. Again, this could be achieved by conventional signalling methods.

Simultaneously, link selectors LS1 and LS2 will operate as described above, as soon as traffic, or appropriate signalling, is detected on P5, at either end of the link.

By having the link selectors operating essentially independently from the above mentioned second phase of setting up the protection path, the improved bandwidth efficiency can be obtained without a corresponding increase in complexity of control. There is no need to make alterations to the routing tables or algorithms in the switches of the nodes, or in the modules on the shared protection ring. This is a significant advantage over existing mesh networks. It means that changes can be made to the network, or to predetermined protection paths, at one point in the network, and they will have only a localised effect. In other words, it will not be necessary to check there is sufficient bandwidth for all the protection-paths in the network, when a change is made, as would be the case for conventional mesh network restoration schemes.

Figures 5, 6, 7:
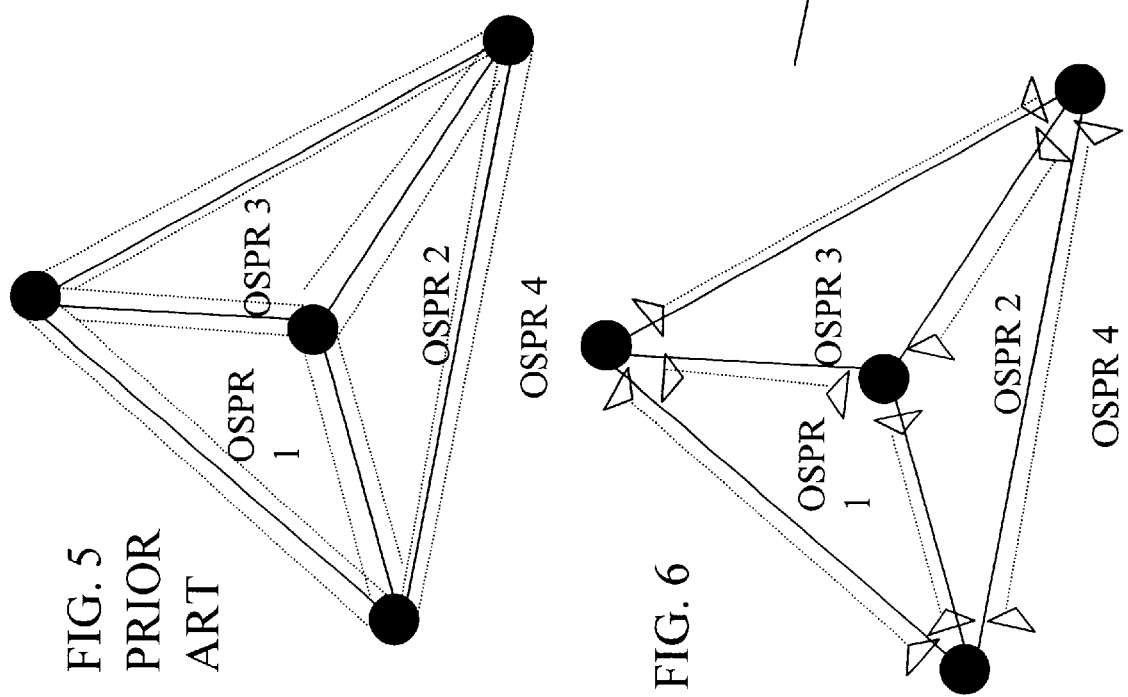
FIG. 5 shows in schematic form a prior art network with four shared protection rings.
FIG. 6 shows a network corresponding to that of FIG. 5, but incorporating an embodiment of the invention.
FIG. 7 shows in schematic form some details of a prior art node of the network of FIG. 5.

FIGS. 5, 6, Showing Scalability of Embodiments of the Invention

FIG. 5 shows a known network, or part of a network, made up of four nodes, each having three working paths to the other three nodes. This results in six working paths, which can be protected by means of four optical shared protection rings (OSPR). Hence, for every working path, there is a protection path passing through two links. As a result, each link carries one working path, and two shared protection rings. This gives a bandwidth efficiency of just 33 percent.

FIG. 6 shows how for each link, a pair of link selectors can be used to enable two OSPRs to share bandwidth on each of the links. Accordingly, the bandwidth efficiency can be improved from 33 percent to 50 percent (where traffic levels are the same on each link). Since this saving can be achieved on every link shown in FIG. 6, it follows that the advantages of this embodiment of the invention are scalable to more complex networks. There is no corresponding increase in complexity of control of switches at the nodes, as this embodiment of the invention is applied to more complex arrangements of protection paths or rings, or to larger networks.

The cost involved in providing, or retrofitting suitable link selectors, can be weighed against the benefit in bandwidth efficiency of the link. Thus networks with longer transmission distances, and fewer nodes, will see correspondingly greater benefits from these embodiments of the invention.

FIGS. 7–10, Details of a Node

FIG. 7 shows in schematic form a prior art node for use in the prior art networks of FIG. 5. A switch acting as a traffic source switch, performs add/drop multiplexing, and switching of traffic between the three working paths illustrated. Each working path has a WDM (Wavelength Division Multiplexer) WDM25, WDM26, WDM27, for multiplexing working paths and protection paths onto each link. Each path is assumed to be on one wavelength. In practice there might be many even hundreds of wavelengths multiplexed, and therefore many hundreds or thousands of paths between different end points, sharing a single link.

The node illustrated would be appropriate for the right-hand lower node of FIG. 5. Accordingly, this node is part of OSPRs 2, 3 and 4. There is a module for each of these rings. These can be in the form of Optical Cross Connects (OCC) for enabling their respective. shared protection ring to bypass the node, or to couple a protection path from the traffic source switch onto the ring, in a particular direction around the ring. The traffic source switch would be responsible for coupling a working path to its respective protection path, in the event of a fault. The OCC is an example of the first optical switch.

As illustrated, the working paths are passed through the OSPR module, which can enable optical switching of the working paths outside the traffic source switch. The working paths could bypass the OSPR modules.

Figure 8:
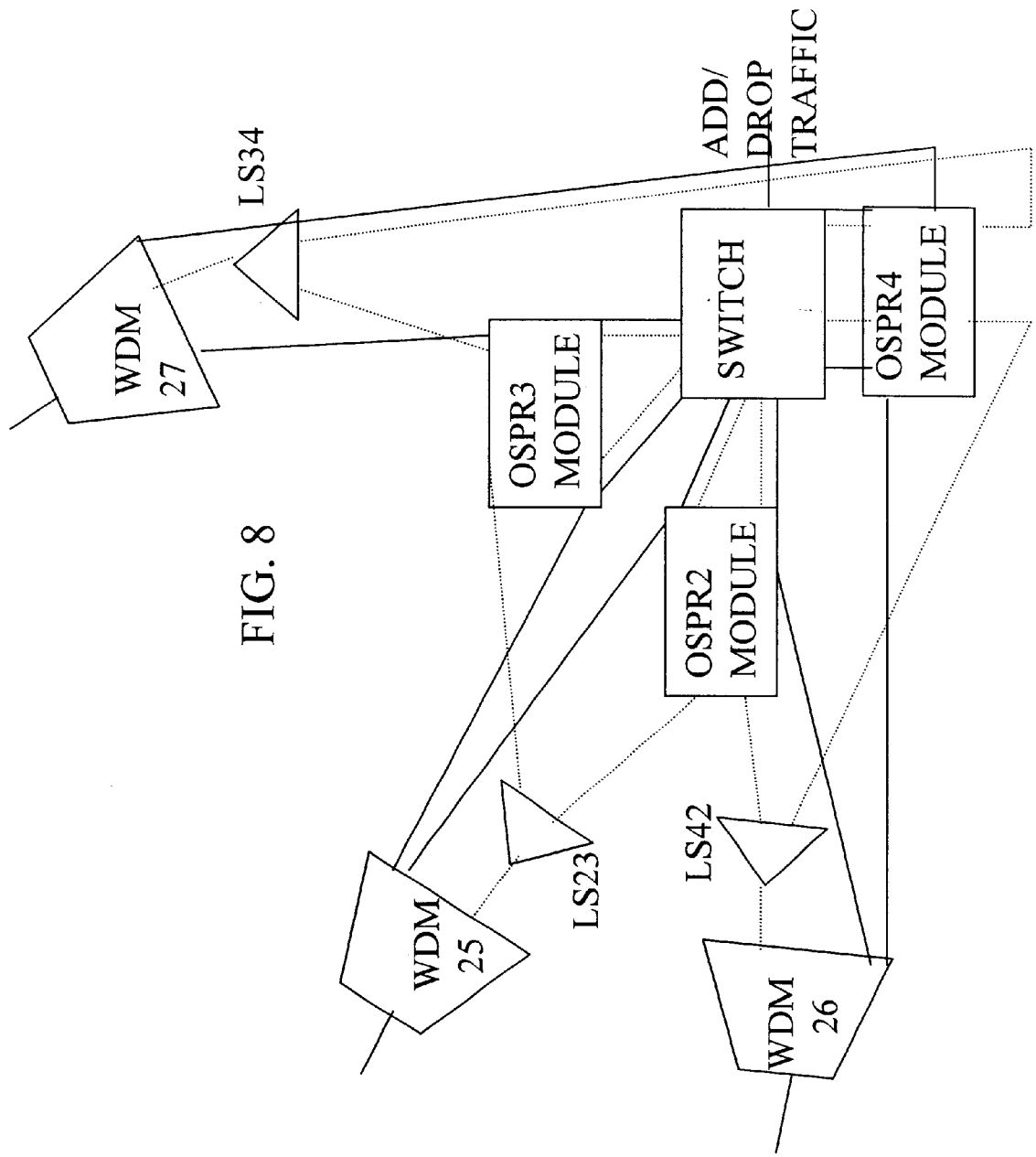
FIG. 8 shows a node corresponding to that of FIG. 7, but incorporating an embodiment of the invention.

FIG. 8 shows the same node, but including link selectors LS23, LS34 and LS42, for use as the right-hand lower node of FIG. 6. LS23 couples protection rings two and three from modules OSPR2 and OSPR3, and feeds the selected one to WDM25. Link selector LS34 couples protection rings 3 and 4, from modules OSPR3 and OSPR4, onto WDM27. Ring selector 42 couples protection rings 2 and 4 from modules OSPR2 and OSPR4 onto WDM26.

Each link selector may be implemented in the form of an optical switch. There are various well-known technologies for optical switches, which need not be described here in more detail.

Each OSPR module may act as an optical switching module either for the protection ring alone, or for both the protection ring and working paths, to free the source switch of the parts of the switching which can conveniently be carried out optically. Various configurations are conceivable, according to how much is handled by the module as opposed to the traffic source switch. As the link selectors operate essentially independently of the module and the switch, there is no need to describe the module or traffic source switch in more detail here.

Figure 9:
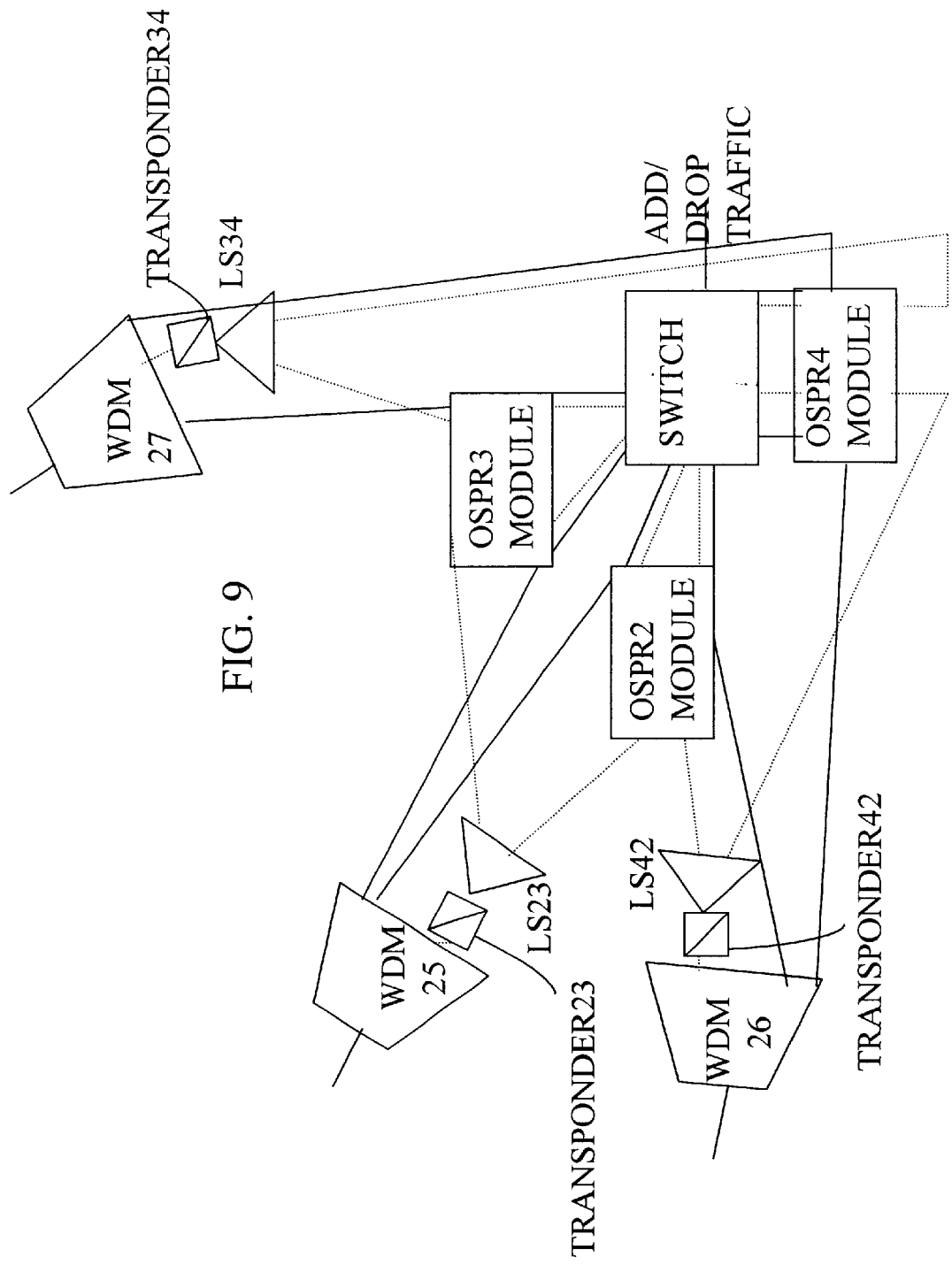
FIG. 9 shows a node incorporating another embodiment of the invention.

FIG. 9 shows the node of FIG. 8, and additionally shows transponders 23, 34 and 42, located on the link side of each of the link selectors. Transponders are for converting the optical signal from a wavelength suitable for short ranges, to a wavelength more suitable for long range transmission over a link. This normally involves converting from optical domain to electrical domain, then back to the optical domain at the different wavelength.

There are various positions conceivable for the transponder. If, as shown, it is at the link side of the link selector, then only one transponder is needed for each link selector. They can be expensive components, and so there are cost advantages in reducing the number of transponders.

An alternative location is to divide the transponder into two halves, and have the two halves sandwich the link selector (not illustrated). This would mean there would be one long range interface at the link side, the link selector could be implemented in the electrical domain, and there would be two cheaper short range wavelength interfaces of the transponder at the node side of the link selector.

A further alternative would be to have the entire transponder at the node side of the link selector, between the link selector and the OSPR modules. This might be convenient if the link selectors are being retrofitted to an existing node with transponders already in place, perhaps tightly integrated with the OSPR modules.

A further alternative for the transponders is to provide them between the OSPR module and the switch. This means that traffic which is on the protection ring and is on a path which bypasses the switch, need not pass through the transponders. Since the transponders are wavelength, or protocol specific, there is an advantage in keeping the transponders out of the OSPR ring. Doing this means that other wavelengths or protocols could be used on the ring, without having to replace transponders on all the nodes connected to that ring. This would make the network easier to upgrade.

Figure 10:
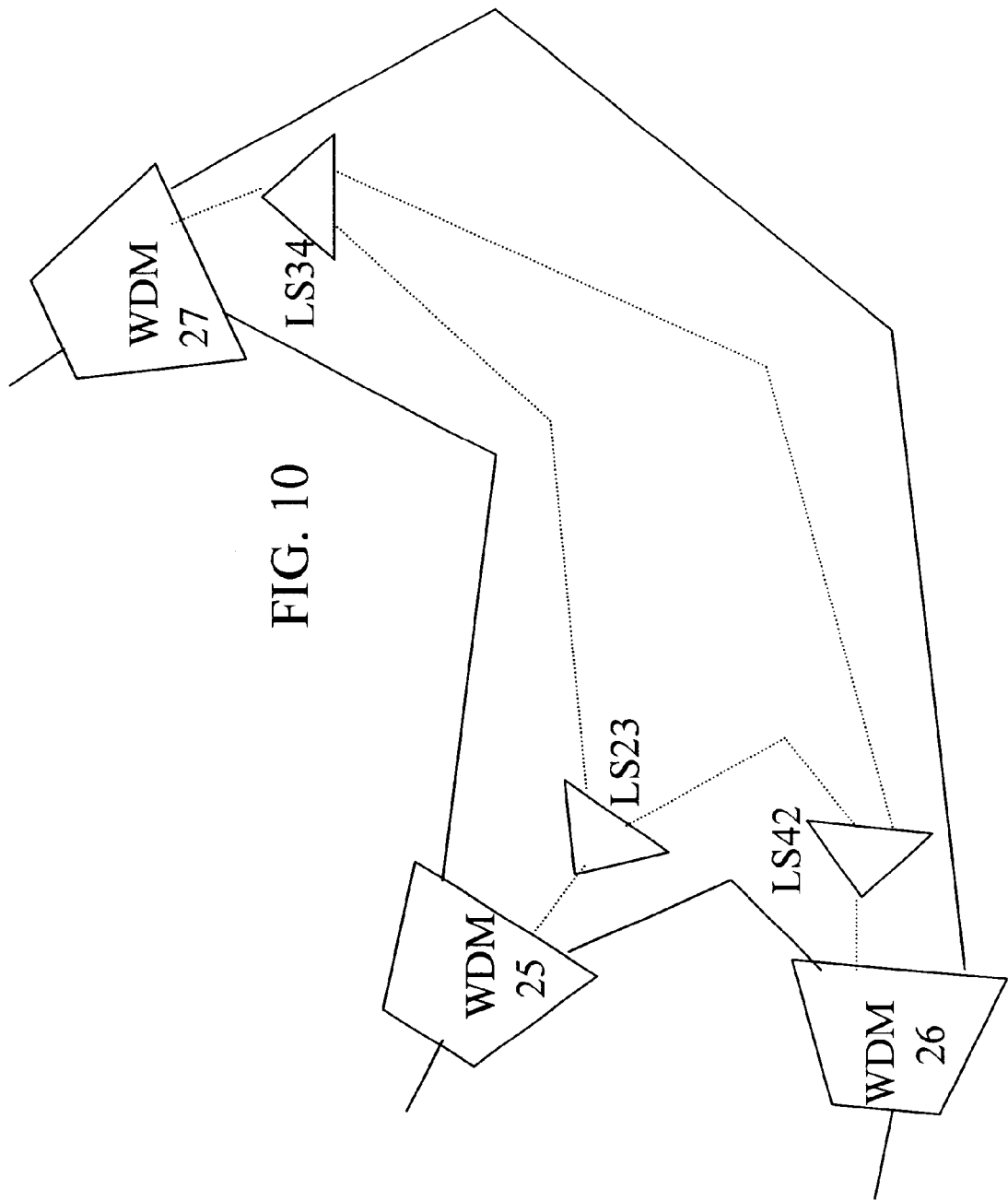
FIG. 10 shows another node, incorporating another embodiment of the invention.

FIG. 10 shows an embodiment of a node with no switch, or add/drop facility. In this case, there are no OSPR modules, and the traffic on each working path or protection path passes straight through the node along its predetermined and hard wired path. There may be no need for any transponders in this arrangement.

FIGS. 11A–11D, Other Configurations of Nodes

FIG. 11A shows in schematic form a network in which the working paths use a number of rings with shared protection rings following the same routes. OSPR modules are provided at various points around the rings, for coupling protection paths to the shared protection rings. Where the rings overlap, more than one ring will be multiplexed over a given link. Accordingly, various types of nodes exist. Three different types are highlighted, and shown in expanded form in FIGS. 11B to 11D.

In FIG. 11B, the node is at a three-way junction. Three working rings pass through the node. For two of the rings an OSPR module is provided for the corresponding protection rings, for coupling the respective protection ring to a local traffic source switch (not illustrated) where working paths can be switched onto a protection path. Wherever there is a local traffic source switch, there may be an arrangement (not illustrated) for coupling working paths onto the working ring. In this example, the working rings are not switched by the OSPR modules, and so the working ring might pass through an ADM. As discussed above the alternative of passing the working rings through the OSPR module, to provide a means of coupling working paths from a traffic source switch onto the working ring, as shown in FIGS. 8 to 10, is also viable.

For the ring which does not have an OSPR module, the working path and the protection path are routed through the node. A link selector LS is provided for each link, to enable the respective protection rings to share bandwidth.

FIG. 11C shows the case where three rings meet, but none of the rings have an OSPR module, and there is no associated local traffic source switch. Each of the links has a respective link selector, as shown in FIG. 11B.

In FIG. 11D there is shown a node with two links, and two rings passing through the node. One OSPR is provided, for coupling the protection ring of one of the working rings, to a local traffic source switch (not illustrated). Each link has an associated link selector LS.

In each of FIGS. 11B to 11D, Wavelength Division Multiplexers (WDMs) are provided for each link. In principle the working paths and protection paths could be multiplexed in some other way, e.g. by time division multiplexing, or by physical division, i.e. on separate optical fibres.

In each of FIGS. 11B to 11D, the working paths are shown as bypassing the OSPR modules. As discussed above, this is one of several alternatives. Other features such as fault monitors, signalling mechanisms, and transponders, are not illustrated, for the purpose of clarity.

Other Examples, Variations

Although nodes with two links and three links have been shown, the invention is clearly applicable to, and scalable to work with nodes with four links or more. In typical long haul networks, most nodes have two links, i.e. they are ADM nodes rather than junctions. Some nodes have three links, i.e. they are a junction, and may or may not have ADMs. Very few nodes in practice have one link or four or more links.

In principle, the link selectors need not be located at a node. They could be located along the link. However, it is convenient to local them in nodes, to enable the bandwidth efficiency advantage to extend over an entire link. Also, in each node, the protection paths are accessible without additional demultiplexing or multiplexing.

The traffic source switch at a node can be a packet switch or a circuit switch or an ATM (Asynchronous Transfer Mechanism)/Frame Switch, as required. The advantages of the invention can apply to existing lower speed optical networks using OC3 or similar standards, but the benefits may be more marked for long haul high bit rate networks, using OC48, OC192 for example.

Although the link selector is illustrated as selecting one of two or three paths, in principle, the operation of the link selector is not limited to this. The selection of which of the paths is allocated to the given link is intended to encompass selecting two of three paths, or "m" of "n" paths (where 1<"m"<"n"), or selecting fractions of paths. In the case of selecting fractions of paths, the network would need to support pre-configured divided protection paths following different routes, which could yield improved bandwidth efficiency, though at the expense of added complexity at the nodes.

In principle, the condition of having no two secondary paths overlap on more than one link, need not apply to every path. If there are some working paths which are lower priority than others, then perhaps the risk of a single fiber cut in a particular places causing these lower priority paths to be unrecoverable, is tolerable. In such cases, the secondary paths for these lower priority paths could be pre-configured to overlap those of higher priority paths, on more than one link.

Although some of the examples described refer to WDM transmission, other embodiments not using WDM, or using DWDM (dense wavelength division multiplexing) or TDM (time division multiplexing) or physically divided transmission of channels e.g. on different fibers, can be conceived.

Although the examples show an overlap and link selectors on a single link, in principle, where there is overlap on a number of consecutive links, a single pair of link selectors could be used for the entire overlap, rather than using a pair of selectors for each link. In other words, in this document references to a given link are intended to encompass also multiple consecutive given links. In this case, if there is a ring module in between a pair of link selectors, a consequence is that the ring module will need to be able to signal to a link selector to control allocation of the given links Other variations of the described embodiments, and other applications of the invention can be conceived and are intended to be within the scope of the claims.

What is claimed is:

1. An optical network comprising:
   a plurality of nodes and a plurality of links between the nodes,
   a mesh of working paths provided over the links and nodes,
   a plurality of secondary paths provided over the links and nodes, each secondary path for use in case of a failure in a link or node of a working path associated with such secondary path,
   a first shared protection ring being provided for shared use by some of the secondary paths, and being arranged to have a shared link overlapping one or more of the secondary paths and
   a link selector at each end of the shared link to select which of the first shared protection ring or one of said one or more secondary paths overlapping the shared link is allocated to the shared link detection of a failure in a link or node of a working path associated with said first shared protection ring or said one or more of the secondary paths, said link selectors being controlled independently of said shared protection ring.

2. The network of claim 1, wherein any overlapping secondary paths and any overlapping shared rings are arranged such that any two of them do not overlap more than once with each other.

3. The network of claim 1, wherein the first shared protection ring comprises a first optical switch for coupling one or more of the secondary paths to the first shared protection ring, the optical switch being located adjacent to the link selector, on the first shared protection ring.

4. The network of claim 1 further comprising a transponder, at least part of the transponder being located on a link side of the link selector.

5. The network of claim 1 further comprising a first optical switch for coupling one or more of the secondary paths to the first shared protection ring, the optical switch being located adjacent to the link selector, on the first shared protection ring, and a transponder for converting optical wavelength, to launch an optical signal onto the first shared protection ring, the transponder being located on the coupled secondary path before this path enters the first shared protection ring.

6. The network of claim 1, wherein the one or more secondary paths routed to overlap on the shared link use a second shared protection ring which overlaps on the shared link with the first shared protection ring.

7. The network of claim 1, wherein the link selector is controllable on the basis of levels of priority of different secondary paths.

8. The network of claim 1 further comprising a signalling arrangement provided between the link selector and a node at the far end of the shared link so that the same one of the overlapping secondary paths is selected at both ends of the shared link.

9. A node for use in the network of claim 1, wherein at one end of the shared link, the node comprises the link selector for selecting which of the secondary paths routed to overlap on the shared link is allocated to the shared link on detection of a failure.

10. A node for use in claim 1 or claim 9, wherein, at another end of the shared link, the node comprises a further link selector for the shared link for selecting which of the overlapping secondary paths is allocated to the shared link, the further link selector being arranged to receive an indication of the selection of the link selector at the other end of the shared link, and being arranged to make the same selection.

11. A link selector for use in the node of claim 9, for selecting which of the secondary. paths routed to overlap on the shared link is allocated to the shared link on detection of a failure.

12. A controller for controlling the link selector of claim 11, comprising circuitry for receiving an indication of which of the overlapping secondary paths is being used, determining which is first to be in use and controlling the link selector on the basis of which secondary path is first in use.

13. A method of transmitting data traffic over a working path of the network of claim 1.

14. The method of claim 13, the working path having an associated secondary path which is routed via one of the link selectors.

15. The method of claim 14 comprising the step of switching the data traffic from the working path to the associated secondary path.

16. Software for managing the optical network of claim 1 to provide a data transmission service.

17. Software for determining a configuration of secondary paths in the network of claim 1, such that any two of them overlap over only a single one of the links, and otherwise are routed over separate links so that no two secondary paths share more than one of the links.

18. A node for use in an optical network, the network comprising a number of other nodes and a plurality of links between the nodes, a mesh of working paths provided over the links and nodes, a plurality of secondary paths provided over the links and nodes, each secondary path for use in case of a failure in a link or node of a working path-associated with such secondary path, some of the secondary paths having pre-determined routing so as to overlap on a shared link of a first shared protection ring, the node being for use at one end of the shared link, and comprising:

a selector for the shared link to select which of the first shared protection ring or one of secondary paths routed to overlap on the shared link is allocated to the shared link on detection of a failure in a link or node of a working path associated with said first shared protection ring or said one or more of the secondary paths, said link selector being controlled independently of said shared protection ring.

* * * * *